United States Patent
Pavithran et al.

(10) Patent No.: US 10,009,528 B2
(45) Date of Patent: Jun. 26, 2018

(54) AUTOFOCUS CAMERA MODULE PACKAGING WITH CIRCUITRY-INTEGRATED ACTUATOR SYSTEM

(75) Inventors: Prebesh Pavithran, Bukit Mertajam (MY); Yeow Thiam Ooi, Butterworth (MY); Hung Khin Wong, Wing Onn Garden (MY); Haw Chyn Cheng, Butterworth (MY); Khen Ming Goh, Mutiara Damansara (MY)

(73) Assignee: NAN CHANG O-FILM OPTOELECTRONICS TECHNOLOGY LTD, Nanchang (CN)

( * ) Notice: Subject to any disclaimer, the term of this patent is extended or adjusted under 35 U.S.C. 154(b) by 0 days. days.

(21) Appl. No.: 13/404,838

(22) Filed: Feb. 24, 2012

(65) Prior Publication Data
US 2012/0218449 A1    Aug. 30, 2012

Related U.S. Application Data

(60) Provisional application No. 61/446,156, filed on Feb. 24, 2011.

(51) Int. Cl.
  *H04N 5/225* (2006.01)
  *H04N 5/232* (2006.01)

(52) U.S. Cl.
  CPC ....... *H04N 5/2257* (2013.01); *H04N 5/23212* (2013.01)

(58) Field of Classification Search
  CPC .. H04N 5/2253; H04N 5/2254; H04N 5/2257; H04N 5/2259

(Continued)

(56) References Cited

U.S. PATENT DOCUMENTS

| 4,257,086 A | 3/1981 | Gulliksen |
| 4,290,168 A | 9/1981 | Binge |

(Continued)

FOREIGN PATENT DOCUMENTS

| CN | 1517735 A | 8/2004 |
| EP | 1441509 A2 | 7/2004 |

(Continued)

OTHER PUBLICATIONS

PCT Application No. PCT/US2012/026585, International Search Report dated Dec. 26, 2012.

(Continued)

*Primary Examiner* — Sinh Tran
*Assistant Examiner* — Zhenzhen Wu
(74) *Attorney, Agent, or Firm* — Polsinelli PC

(57) ABSTRACT

A camera module with no PCB that instead has a lens actuator/housing that has circuitry on a bottom surface thereof for direct electrical connection to a mobile electronic device. The housing further has a recess formed in the bottom surface thereof to receive an image sensor. The circuitry is three-dimensional in that it includes a first set of contact pads on one planar surface for connection to the mobile electronic device, a second set of contact pads on a planar surface within the recess for connection to the image sensor, and conductive traces that connect each of the contact pads of the first set with an associated one of the contact pads of the second set by having the trace follow a path from the first planar surface, along a intersecting third planar surface to the second planar surface.

19 Claims, 5 Drawing Sheets

(58) Field of Classification Search
USPC ........ 348/373–375, 360, 340, 335; 250/239; 257/59
See application file for complete search history.

(56) References Cited

U.S. PATENT DOCUMENTS

| | | | |
|---|---|---|---|
| 4,690,512 A | 9/1987 | Forsyth | |
| 4,987,435 A | 1/1991 | Touma et al. | |
| 5,034,824 A | 7/1991 | Morisawa et al. | |
| 5,119,121 A | 6/1992 | Kobayashi et al. | |
| 5,149,181 A | 9/1992 | Bedford | |
| 5,529,936 A | 6/1996 | Rostoker | |
| 5,689,746 A | 11/1997 | Akada et al. | |
| 5,908,586 A | 6/1999 | Hobbs et al. | |
| 6,249,311 B1 | 6/2001 | Rouse et al. | |
| 6,381,072 B1 | 4/2002 | Burger | |
| 6,476,417 B2* | 11/2002 | Honda et al. ................. | 257/59 |
| 6,530,703 B2 | 3/2003 | Nakano et al. | |
| 6,582,079 B2 | 6/2003 | Levine | |
| 6,670,205 B1 | 12/2003 | Byun | |
| 6,682,161 B2 | 1/2004 | Yun | |
| 6,683,298 B1 | 1/2004 | Hunter et al. | |
| 6,841,883 B1 | 1/2005 | Farnworth et al. | |
| 6,853,005 B2 | 2/2005 | Ikeda | |
| 7,019,374 B2 | 3/2006 | Kayanuma et al. | |
| 7,046,296 B2 | 5/2006 | Shinomiya | |
| 7,078,799 B2 | 7/2006 | Vittu | |
| 7,156,564 B2 | 1/2007 | Watanabe et al. | |
| 7,167,376 B2 | 1/2007 | Miyashita et al. | |
| 7,245,319 B1 | 7/2007 | Enomoto | |
| 7,301,577 B2 | 11/2007 | Sakamoto | |
| 7,379,112 B1 | 5/2008 | Raad | |
| 7,414,661 B2 | 8/2008 | Hartlove et al. | |
| 7,444,073 B2 | 10/2008 | Lee | |
| 7,477,461 B2 | 1/2009 | Bareau et al. | |
| 7,494,292 B2 | 2/2009 | Kong et al. | |
| 7,579,583 B2* | 8/2009 | Mok et al. ................. | 250/239 |
| 7,605,991 B2 | 10/2009 | Chiang | |
| 7,638,813 B2 | 12/2009 | Kinsman | |
| 7,675,565 B2 | 3/2010 | Cheng | |
| 7,679,669 B2 | 3/2010 | Kwak | |
| 7,796,187 B2 | 9/2010 | Shangguan et al. | |
| 7,806,606 B2 | 10/2010 | Westerweck | |
| 7,825,985 B2 | 11/2010 | Westerweck et al. | |
| 7,864,245 B2 | 1/2011 | Yoon et al. | |
| 8,112,128 B2 | 2/2012 | Lee | |
| 8,149,321 B2 | 4/2012 | Ryu et al. | |
| 8,545,114 B2 | 10/2013 | Pavithran et al. | |
| 8,605,208 B2 | 12/2013 | Singh et al. | |
| 2001/0028513 A1 | 10/2001 | Takanashi et al. | |
| 2001/0050717 A1 | 12/2001 | Yamada et al. | |
| 2002/0136556 A1 | 9/2002 | Nomura et al. | |
| 2002/0142798 A1 | 10/2002 | Miyake | |
| 2002/0144369 A1 | 10/2002 | Biggs et al. | |
| 2003/0012573 A1 | 1/2003 | Sekizawa et al. | |
| 2003/0016452 A1 | 1/2003 | Sayag | |
| 2003/0043477 A1 | 3/2003 | Saitoh | |
| 2003/0071342 A1 | 4/2003 | Honda et al. | |
| 2003/0128442 A1 | 7/2003 | Tanaka et al. | |
| 2004/0017501 A1 | 1/2004 | Asaga et al. | |
| 2004/0042780 A1 | 3/2004 | Kindaichi et al. | |
| 2004/0042785 A1 | 3/2004 | Watanabe et al. | |
| 2004/0042786 A1 | 3/2004 | Watanabe et al. | |
| 2004/0056974 A1 | 3/2004 | Kitajima et al. | |
| 2004/0095657 A1 | 5/2004 | Takanashi et al. | |
| 2004/0150891 A1 | 8/2004 | Ichino | |
| 2004/0165877 A1 | 8/2004 | Hsiao | |
| 2004/0189862 A1 | 9/2004 | Gustaysson et al. | |
| 2004/0201773 A1 | 10/2004 | Ostergard | |
| 2004/0212719 A1 | 10/2004 | Ikeda | |
| 2004/0223072 A1 | 11/2004 | Maeda et al. | |
| 2005/0014538 A1 | 1/2005 | Hyun et al. | |
| 2005/0063698 A1 | 3/2005 | Usuda et al. | |
| 2005/0157195 A1 | 7/2005 | Ohashi et al. | |
| 2005/0219398 A1 | 10/2005 | Sato et al. | |
| 2005/0219399 A1 | 10/2005 | Sato et al. | |
| 2005/0248684 A1 | 11/2005 | Machida | |
| 2006/0066959 A1 | 3/2006 | Koga et al. | |
| 2006/0083503 A1 | 4/2006 | Fukai | |
| 2006/0087018 A1 | 4/2006 | Chao et al. | |
| 2006/0109367 A1 | 5/2006 | Hirooka | |
| 2006/0124746 A1 | 6/2006 | Kim et al. | |
| 2006/0127085 A1 | 6/2006 | Matsuki et al. | |
| 2006/0132644 A1 | 6/2006 | Shangguan et al. | |
| 2006/0181748 A1 | 8/2006 | Makii et al. | |
| 2006/0192885 A1 | 8/2006 | Calvet et al. | |
| 2006/0209205 A1 | 9/2006 | Tsai | |
| 2006/0215053 A1 | 9/2006 | Kinoshita | |
| 2006/0216014 A1 | 9/2006 | Morinaga et al. | |
| 2006/0243884 A1 | 11/2006 | Onodera et al. | |
| 2006/0251414 A1 | 11/2006 | Nishizawa | |
| 2006/0257131 A1 | 11/2006 | Yoon et al. | |
| 2006/0261257 A1 | 11/2006 | Hwang | |
| 2007/0018043 A1 | 1/2007 | Lamoree et al. | |
| 2007/0047952 A1 | 3/2007 | Kim et al. | |
| 2007/0052050 A1 | 3/2007 | Dierickx | |
| 2007/0077051 A1 | 4/2007 | Toor et al. | |
| 2007/0077052 A1 | 4/2007 | Chang | |
| 2007/0091198 A1 | 4/2007 | Watanabe et al. | |
| 2007/0108847 A1 | 5/2007 | Chang | |
| 2007/0122146 A1 | 5/2007 | Ryu | |
| 2007/0126923 A1 | 6/2007 | Shinomiya | |
| 2007/0146145 A1 | 6/2007 | Lehrman et al. | |
| 2007/0146489 A1 | 6/2007 | Kosako et al. | |
| 2007/0146534 A1 | 6/2007 | Kim et al. | |
| 2007/0201866 A1 | 8/2007 | Kihara | |
| 2007/0212061 A1 | 9/2007 | Woo | |
| 2007/0217786 A1 | 9/2007 | Cho et al. | |
| 2007/0258006 A1 | 11/2007 | Olsen et al. | |
| 2007/0275505 A1 | 11/2007 | Wolterink et al. | |
| 2007/0280667 A1 | 12/2007 | Shin | |
| 2008/0054934 A1 | 3/2008 | Jungert | |
| 2008/0055438 A1* | 3/2008 | Lee et al. ................. | 348/294 |
| 2008/0143864 A1 | 6/2008 | Yamaguchi et al. | |
| 2009/0015706 A1 | 1/2009 | Singh | |
| 2009/0128681 A1* | 5/2009 | Kim ................. | 348/335 |
| 2010/0141825 A1* | 6/2010 | Kim et al. ................. | 348/340 |
| 2010/0182498 A1* | 7/2010 | Niwa ................. | H04N 5/2254 348/374 |
| 2010/0325883 A1 | 12/2010 | Westerweck et al. | |
| 2011/0194023 A1* | 8/2011 | Tam et al. ................. | 348/374 |
| 2011/0288154 A1 | 9/2011 | Westerweck et al. | |
| 2012/0140101 A1* | 6/2012 | Afshari et al. ................. | 348/308 |
| 2012/0320260 A1* | 12/2012 | Ha ................. | H01L 27/14618 348/360 |
| 2014/0028898 A1 | 1/2014 | Pavithran et al. | |

FOREIGN PATENT DOCUMENTS

| | | |
|---|---|---|
| JP | 02-079685 A | 3/1990 |
| JP | 07-131701 A | 5/1995 |
| JP | 07-181389 A | 7/1995 |
| JP | 10-327344 A | 12/1998 |
| JP | 2001-292354 A | 10/2001 |
| JP | 2001-333332 A | 11/2001 |
| JP | 2002-280535 A | 9/2002 |
| JP | 2004-061623 A | 2/2004 |
| JP | 2004-088713 A | 3/2004 |
| JP | 2004-200965 A | 7/2004 |
| JP | 2004-282778 A | 7/2004 |
| JP | 2004-226872 A | 8/2004 |
| JP | 2004-304605 A | 10/2004 |
| JP | 2004-328474 A | 11/2004 |
| JP | 2005-107084 A | 4/2005 |
| JP | 2005-148109 A | 6/2005 |
| JP | 2005-266129 A | 9/2005 |
| JP | 2005-295050 A | 10/2005 |
| JP | 2005-340539 A | 12/2005 |
| JP | 2005-539276 A | 12/2005 |
| JP | 2006-039480 A | 2/2006 |
| JP | 2006-154319 A | 6/2006 |
| JP | 2006-180487 A | 7/2006 |
| JP | 2006-276897 A | 10/2006 |
| JP | 2007-108534 A | 4/2007 |

(56) References Cited

FOREIGN PATENT DOCUMENTS

| KR | 10 2007 0073017 A | 7/2007 |
|---|---|---|
| WO | WO 2004/027880 A2 | 4/2004 |
| WO | WO 2006/093377 A1 | 9/2006 |
| WO | WO 2008/133943 A1 | 11/2008 |
| WO | WO 2009/014627 A1 | 1/2009 |
| WO | WO 2012/161802 A2 | 11/2012 |

OTHER PUBLICATIONS

PCT Application No. PCT/US2012/026585, International Preliminary Report on Patentability dated Sep. 6, 2013.
U.S. Appl. No. 12/150,118, Office Action dated Dec. 20, 2010.
U.S. Appl. No. 12/150,118, Office Action dated Oct. 11, 2011.
U.S. Appl. No. 12/150,118, Office Action dated May 24, 2012.
U.S. Appl. No. 12/150,118, Notice of Allowance dated Dec. 14, 2012.
U.S. Appl. No. 12/150,118, Supplemental Notice of Allowance dated Jun. 13, 2013.
U.S. Appl. No. 12/150,118, Corrected Notice of Allowance dated Jul. 24, 2013.
U.S. Appl. No. 12/150,118, Corrected Notice of Allowance after IDS dated Sep. 26, 2013.
U.S. Appl. No. 12/150,118, Corrected Notice of Allowance after IDS dated Nov. 4, 2013.
PCT Application No. PCT/US2008/005289, International Search Report and Written Opinion dated Sep. 2, 2008.
PCT Application No. PCT/US2008/005289, International Preliminary Report on Patentability dated Nov. 5, 2009.
CA Patent Application Serial No. 2,685,080, Office Action dated Nov. 20, 2013.
CN Patent Application Serial No. 200880021337.3, Office Action dated Feb. 28, 2011 (English translation).
JP Patent Application Serial No. 2010-506257, Office Action dated Oct. 17, 2011 (English translation).
JP Patent Application Serial No. 2010-506257, Office Action dated Sep. 6, 2012 (English translation).
JP Patent Application Serial No. 2010-506257, Office Action dated Oct. 16, 2013 (English translation).
U.S. Appl. No. 11/980,021, Notice of Allowance, dated Sep. 2, 2010.
PCT App. No. PCT/US08/008708, International Search Report and Written Opinion dated Dec. 10, 2008.
PCT App. No. PCT/US08/008708, International Preliminary Report on Patentability dated Jan. 19, 2010.
CN Application No. 200880023704.3, Office Action dated Jan. 26, 2011 (English translation).
CN Application No. 200880023704.3, Office Action dated Jun. 30, 2011 (English translation).
CN Application No. 200880023704.3, Office Action dated Dec. 7, 2011 (English translation).
CN Application No. 200880023704.3, Office Action dated Jul. 24, 2012 (English translation).
CN Application No. 200880023704.3, Office Action dated Feb. 20, 2013 (English translation).
CN Application No. 200880023704.3, Notice of Allowance dated Aug. 29, 2013 (English translation).
JP Application No. 2010-517011, Office Action dated Dec. 6, 2011 (English translation).
JP Application No. 2010-517011, Office Action dated Oct. 30, 2012 (English translation).
U.S. Appl. No. 12/873,995, Office Action dated Mar. 27, 2012.
U.S. Appl. No. 12/873,995, Office Action dated Jul. 18, 2012.
U.S. Appl. No. 12/873,995, Advisory Action dated Sep. 7, 2012.
U.S. Appl. No. 12/873,995, Office Action dated May 31, 2013.
U.S. Appl. No. 12/873,995, Office Action dated Dec. 17, 2013.
U.S. Appl. No. 13/149,638, Restriction Requirement dated Jun. 19, 2013.
U.S. Appl. No. 13/149,638, Office Action dated Oct. 1, 2013.
U.S. Appl. No. 13/046,563, Office Action dated Sep. 12, 2012.
U.S. Appl. No. 13/046,563, Notice of Allowance dated May 14, 2013.
U.S. Appl. No. 13/046,563, Supplemental Notice of Allowance dated Aug. 30, 2013.
U.S. Appl. No. 14/040,080, Office Action dated Dec. 2, 2013.
U.S. Appl. No. 12/150,119, Office Action dated Dec. 16, 2010.
U.S. Appl. No. 12/150,119, Office Action dated Sep. 28, 2011.
U.S. Appl. No. 12/150,119, Office Action dated Apr. 30, 2012.
U.S. Appl. No. 12/150,119, Office Action dated Apr. 16, 2013.
U.S. Appl. No. 12/150,119, Office Action dated Oct. 18, 2013.
U.S. Appl. No. 12/150,119, Office Action dated May 7, 2014.
PCT Application No. PCT/US2008/005298, International Search Report and Written Opinion dated Sep. 2, 2008.
PCT Application No. PCT/US2008/005298, International Preliminary Report on Patentability dated Nov. 5, 2009.
CA Patent Application Serial No. 2,685,083, Office Action dated Nov. 20, 2013.
CN Patent Application Serial No. 200880021357.0, Office Action dated Mar. 9, 2011 (English translation).
CN Patent Application Serial No. 200880021357.0, Office Action dated Mar. 30, 2012 (English translation).
CN Patent Application Serial No. 200880021357.0, Office Action dated Dec. 21, 2012 (English translation).
CN Patent Application Serial No. 200880021357.0, Office Action dated Jul. 3, 2013 (English translation).
CN Patent Application Serial No. 200880021357.0, Office Action dated Apr. 11, 2014 (English translation).
JP Patent Application Serial No. 2010-506259, Office Action dated Oct. 17, 2011 (English translation).
JP Patent Application Serial No. 2010-506259, Office Action dated Jun. 11, 2012 (English translation).
JP Patent Application Serial No. 2010-506259, Office Action dated Oct. 7, 2013 (English translation).
JP Patent Application Serial No. 2012-226416, Office Action dated Sep. 11, 2013 (English translation).
JP Patent Application Serial No. 2013-043381, Office Action dated Jan. 22, 2014 (English translation).
U.S. Appl. No. 12/873,995, Notice of Allowance dated Apr. 23, 2014.
U.S. Appl. No. 13/046,563, Notice of Allowance dated May 22, 2014.
U.S. Appl. No. 13/149,638, Office Action dated Jul. 16, 2014.

\* cited by examiner

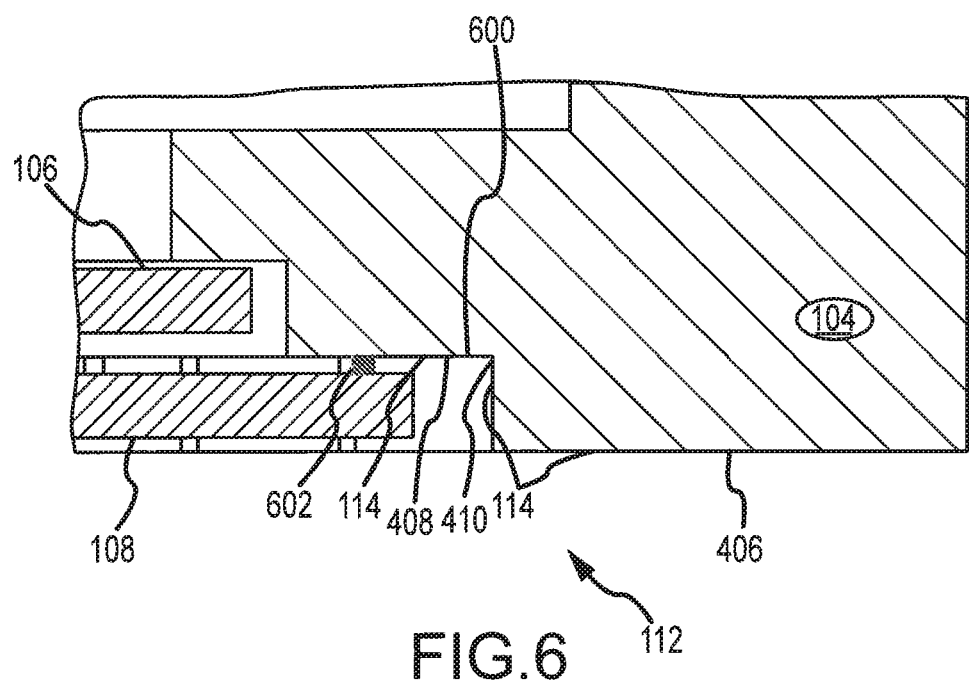

AUTOFOCUS CAMERA MODULE PACKAGING WITH CIRCUITRY-INTEGRATED ACTUATOR SYSTEM

CROSS REFERENCE

This application is the non-provisional of U.S. Provisional Pat. Appl. No. 61/446,156, filed Feb. 24, 2011, entitled "AUTOFOCUS CAMERA MODULE PACKAGING WITH CIRCUITRY-INTEGRATED ACTUATOR SYSTEM," which is hereby incorporated by reference into this application.

BACKGROUND

Digital camera modules are currently being incorporated into a variety of host devices such as, for example, cellular telephones, personal data assistants (PDSs), computers, etc. Such host devices are becoming increasingly more compact and, therefore, permitting less and less space for camera module form factors. Accordingly, host device manufacturers prefer digital camera modules to be small, so that they can be incorporated into the host device without increasing the overall size of the host device. Of course, host device manufacturers also prefer camera modules that capture images of the highest possible quality. Therefore, the goal in designing and manufacturing camera modules is to minimize size and maximize image quality capabilities.

A conventional digital camera module generally includes an integrated image capture device (ICD), passive components, a printed circuit board (PCB), an autofocus actuator, a lens, and a housing. Typically, the ICD, passive components, and autofocus actuator are mounted on the top of PCB. Further, the lens is coupled to the autofocus actuator and the housing is attached to the PCB so that ICD, passive components, and autofocus actuator are covered by the bottom of the housing. The top of the housing typically includes an optical opening that exposes the lens. The bottom surface of the PCB typically includes a plurality of electrical contacts that provide a means for electrically connecting the camera module to a host device.

One problem with conventional camera module designs is that they have a relatively large footprint and, therefore, occupy a significant amount of real-estate area on the host device. This is because the housing has to be large enough to cover the image sensor, the electrical components, the autofocus actuator, and the lens.

Another problem is that conventional camera modules have an overall complex assembly and mechanical stack-up of components which, consequently, lead to other problems. For example, the high overall height of conventional camera modules limits how thin the host devices can be made. As another example, the lens is indirectly coupled to the image sensor through a stack-up of several intermediate components such that an undesirable amount of optical tilt may exist in the camera module. Of course, optical tilt between the lens and the image sensor is a well known problem that is extremely difficult to minimize and can substantially reduce the image quality of a camera module. As another example, the design stage for conventional camera modules is long because it requires arranging multiple electrical components (e.g., IC chips, resistors, capacitors, etc.) on a substrate that has limited available real estate.

It is against this background that a simplified camera module design has been developed, specifically a shorter camera module that reduces optical tilt.

SUMMARY

A camera module for attachment to a mobile electronic device includes a housing having a bottom surface on which electrical circuitry is formed thereon, the circuitry including a first set of contact pads for direct electrical connection to the mobile electronic device and also including a second set of contact pads; a lens received within the housing; and an image sensor electrically and mechanically connected to the housing via the second set of contact pads.

The electrical circuitry on the bottom surface may include three-dimensional circuitry. The electrical circuitry on the bottom surface may include circuitry located on multiple different planes. The multiple planes may include three different planes. The three different planes may include a pair of planes that are substantially parallel to each other and a third plane that intersects the two substantially parallel planes. The electrical circuitry may further include a plurality of conductive traces, each of which interconnects one of the first set of contact pads with one of the second set of contact pads, each conductive trace having a portion on each of the three different planes. The electrical circuitry may further include a plurality of conductive traces, each of which interconnects one of the first set of contact pads with one of the second set of contact pads.

The housing may include a recess formed in the bottom surface thereof that receives the image sensor. The camera module may further include a filter positioned within the housing to reduce the amount of infrared light reaching the image sensor. The lens may be received with the housing in a manner that allows the lens to be selectably moved within the housing within a range of positions to position the lens at selectable distances from the image sensor. The image sensor may be connected to the second set of contact pads via solder bumps. The camera module may not include a separate circuit board located between the image sensor and the mobile electronic device. The interface between the camera module and the mobile electronic device may be via a solder connection between the first set of contact pads and contact pads on the mobile electronic device.

A camera module for attachment to a mobile electronic device includes a housing having a bottom surface on which electrical circuitry is formed thereon, the circuitry including a first set of contact pads for electrical connection to the mobile electronic device and also including a second set of contact pads; a lens received within the housing; and an image sensor electrically and mechanically connected to the housing via the second set of contact pads. The electrical circuitry on the bottom surface includes circuitry located on three different planes, including a pair of planes that are substantially parallel to each other and a third plane that intersects the two substantially parallel planes. The electrical circuitry further includes a plurality of conductive traces, each of which interconnects one of the first set of contact pads with one of the second set of contact pads, each conductive trace having a portion on each of the three different planes. The housing includes a recess formed in the bottom surface thereof that receives the image sensor.

The camera module further includes a filter positioned within the housing to reduce the amount of infrared light reaching the image sensor. The lens may be received with the housing in a manner that allows the lens to be selectably moved within the housing within a range of positions to position the lens at selectable distances from the image sensor. The image sensor may be connected to the second set of contact pads via solder bumps. The camera module may not include a separate circuit board located between the image sensor and the mobile electronic device. The interface between the camera module and the mobile electronic device may be via a solder connection between the first set of contact pads and contact pads on the mobile electronic device.

A camera module for attachment to a mobile electronic device includes a housing having a bottom surface on which electrical circuitry is formed thereon, the circuitry including a first set of contact pads that directly interface with and provide direct electrical connection to the mobile electronic device and also including a second set of contact pads; a lens received within the housing; and an image sensor electrically and mechanically connected to the housing via the second set of contact pads.

There may not be a separate circuit board at the interface between the camera module and the mobile electronic device.

The interface between the camera module and the mobile electronic device is via a solder connection between the first set of contact pads and contact pads on the mobile electronic device.

BRIEF DESCRIPTION OF THE DRAWINGS

FIG. 6 is a close-up cross-sectional view of the camera module of FIG. 1.

DETAILED DESCRIPTION

Figure 1:
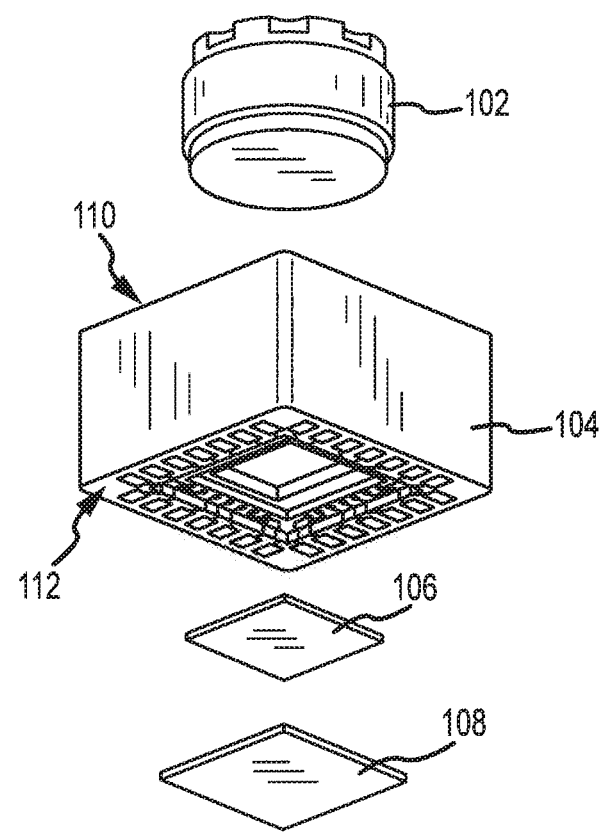
FIG. 1 is an exploded view of a camera module.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements:

FIG. 1 shows a perspective view of a camera module 100 according to one embodiment of the present invention. The camera module 100 includes a lens system 102, an actuator system 104, an infrared (IR) filter 106, and an image sensor 108. As shown, the camera module 100 is exploded along a Z-axis that is optically aligned with the lens system 102 and perpendicularly centered with respect to a planar image sensor surface (not visible) on the top surface of the image sensor 108.

The lens system 102 includes an assembly of lenses (not visible) housed therein and is movably mounted in the actuator system 104. Accordingly, the lens system 102 and the actuator system 104, together, cooperate as part of an autofocus system of the camera module 100. That is, the lens system 102 is responsive to move along the Z-axis when actuated by the actuator system 104 such that the relative distance between the lens system 102 and the image sensor 108 can be controlled.

The actuator system 104 includes a top portion 110 and an opposite bottom portion 112. The top portion 110 is adapted to receive the lens system 102. The bottom portion 112 is adapted to receive the IR filter 106 and the image sensor 108. The bottom portion 112 includes three-dimensional (3D) circuitry formed therefore. Further, 3D circuitry 114 is adapted to be electrically connected to image sensor 108 and facilities electrically connecting camera module 100 to the circuitry of a host define (e.g., cell phone). Most electronic circuitry exists in generally planar form. The 3D circuitry 114 herein lies in more than one plane, and thus is called 3D circuitry.

The IR filter 106 mounts on the actuator system 104, between the bottom portion 112 and the image sensor 108. As shown, the IR filter is aligned with an optical opening formed through the actuator system 104. Not only does the IR filter 106 function as an infrared light filter, but also as a protective shield that prevents debris from accumulating on the image sensor 108. Optionally, an IR filter could be included in the lens system 102 and in such case the IR filter 106 could be replaced by a transparent substrate that functions only as a protective shield.

The image sensor 108 is adapted to be flip-chip mounted on the bottom portion 112 of the actuator system 104. Although not visible, the image sensor 108 includes a top surface whereon a plurality of electrical contact pads are formed around an image sensor array. The contact pads formed on the image sensor 108 are adapted to be electrically coupled to the 3D circuitry 114 of the actuator system 104.

Figure 2:
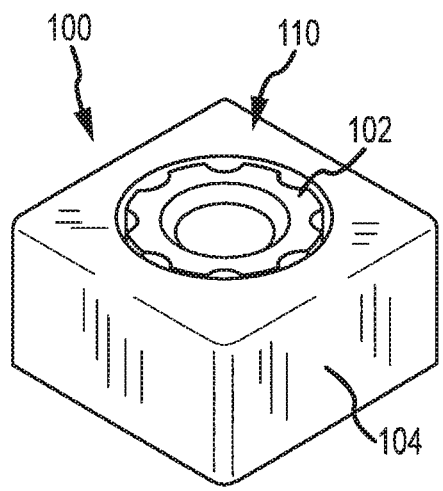
FIG. 2 is a lower perspective view of the camera module of FIG. 1.

FIG. 2 is a top perspective view of the camera module 100 shown assembled. The lens system 102 is movably mounted in an opening formed on the top portion 110 of the actuator system 104.

Figure 3:
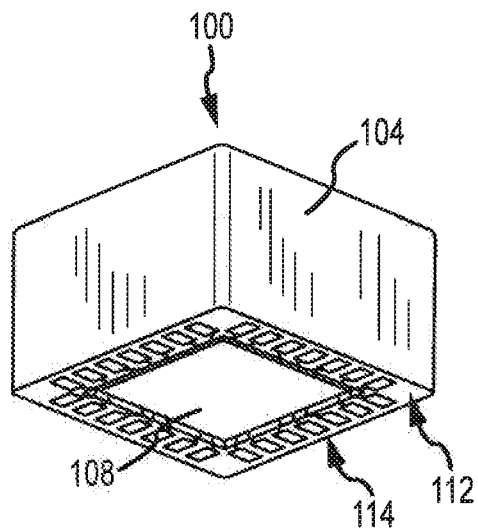
FIG. 3 is an upper perspective view of the camera module of FIG. 1.

FIG. 3 is a bottom perspective view of the camera module 100 shown assembled. The image sensor 108 is flip-chip mounted to the bottom portion 112 and is electrically connected to the 3D circuitry 114.

Figure 4:
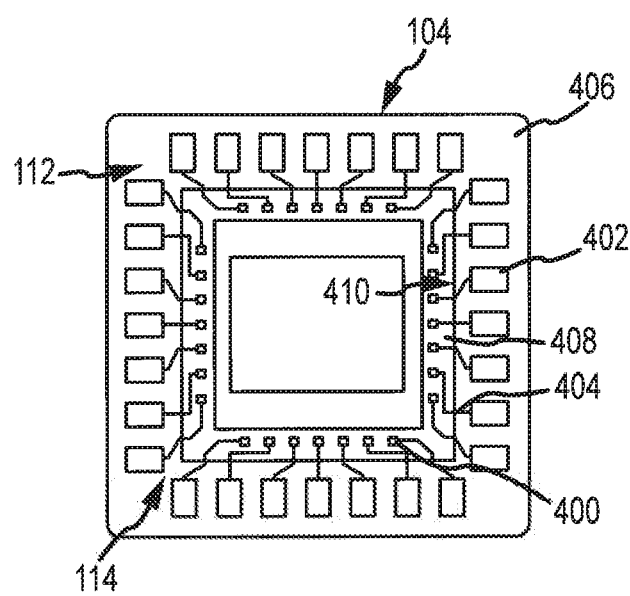
FIG. 4 is a bottom view of an actuator housing of the camera module of FIG. 1.

FIG. 4 is a bottom view of the actuator system 104 showing some additional details of the bottom portion 112. The 3D circuitry 114 includes a set of flip-chip pads 400 located on a planar surface 408 recessed within the actuator system 104, an associated set of contact pads 402 located on a planar surface 406 peripherally outside of the recess on the bottom portion 112 of the actuator system 104, and an associated set of traces 404 formed therebetween on a wall 410 that connects the two planar surfaces 406 and 408. As can be appreciated, the two planar surfaces 406 and 408 do not lie in the same plane and are vertically-offset from each other. The flip-chip pads 400 are adapted to be electrically connected to the associated set of contact pads formed on the top surface of image sensor 108. The contact pads 402 are adapted to be electrically connected to an associated set of contacts of a host device so as to facilitate the electrically connection of camera module 100 to the host device. Each of the traces 404 electrically connects an associated one of the flip-chip pads 400 to an associated one of the contact pads 402.

Figure 5A:
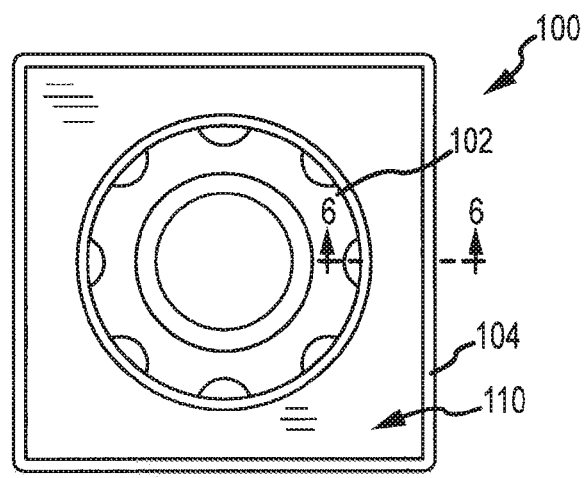
FIGS. 5a, 5b, and 5c are a top view, side view, and bottom view, respectively, of the camera module of FIG. 1.
Figure 5B:
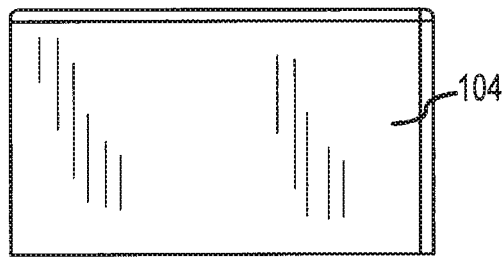
Figure 5C:
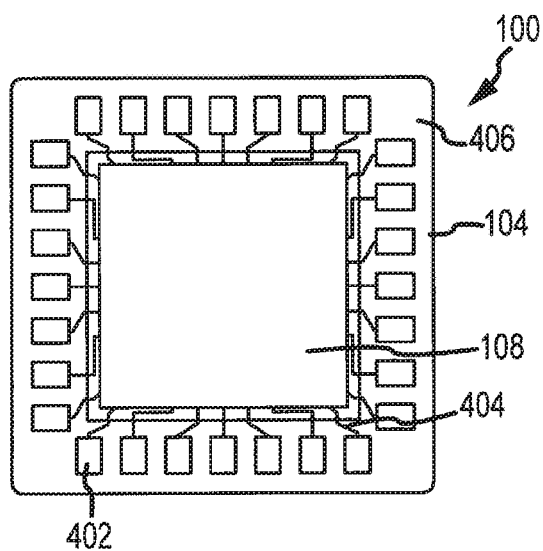

FIGS. 5a, 5b, and 5c are a top view, a side view, and a bottom view, respectively, of the camera module 100. As shown in the side view, the camera module 100 does not include a PCB and, therefore, has a lower Z-height (height along Z-axis) than conventional camera modules. Indeed, the camera module 100 need not employ a PCB because the 3D circuitry 114 is formed directly on the actuator system 104. The reduced height of the camera module 100 provides more room to optimize lens parameters. Not only is the camera module 100 shorter than conventional camera modules, but also has a lower mechanical stack-up of components and is, therefore, less complex. Due to the lower component stack-up, lower optical tilt can be achieved. For example, optical tilt often results where the glue used to mount the housing on the PCB has an uneven thickness and/or the PCB has poor planarity. In contrast to conventional camera modules, the camera module 100 fits smaller form factors, can be manufactured and designed faster and simpler, can achieve an overall higher image quality, and relaxes host device design constraints.

FIG. 6 shows a cross-sectional side view of a portion of the camera module 100 taken along section line 6-6 of FIG. 5a. As shown, bottom portion 112 of actuator system 104 further includes a base/bottom frame 600. In this particular embodiment, the contacts of image sensor 108 are electrically connected to the flip-chip pads 400 of 3D circuitry 114 via flip-chip stud bumps 602 (only one shown). Although stud bumps are discussed, other suitable means for attaching the image sensor to the pads 400 could also be used, such as conductive epoxy, ACF tape, and so forth.

The disclosed camera module overcomes the problems associated with the prior art by providing a novel design that includes circuitry formed directly on the actuator. Accordingly, the present invention eliminates the need for a printed circuit board (PCB) located at the point (or interface) where the camera module connects to the mobile electronic device, thus, reducing complexity, time required for design and manufacturing, size, component stack-up, and optical tilt, and design constraints imparted on host devices. Further, there is no separate circuit board located between the image sensor and the mobile electronic device. The camera module design also improves image quality by providing more space to optimize optical parameters.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A camera module for attachment to a mobile electronic device, the camera module comprising:
    an actuator;
    a housing containing the actuator therein, the housing having a side wall and a bottom formed continuously with the side wall, the bottom including a bottom surface on which electrical circuitry is formed, the electrical circuitry including a first set of contact pads for direct electrical connection to the mobile electronic device and also including a second set of contact pads;
    a lens received within the housing and coupled to the actuator so that the position of the lens can be adjusted by the actuator; and
    an image sensor including a third set of contact pads, the image sensor being electrically and mechanically connected to the housing by directly bonding the third set of contact pads to the second set of contact pads;
    a first recess formed in the bottom surface that receives the image sensor, the first recess being defined by sides extending from the bottom of the module and a first ledge at a base of the first recess perpendicular to the optical axis, the image sensor being mounted on the first ledge;
    a second recess formed in the bottom surface having a narrower opening than the first recess, the second recess being defined by sides from an inner edge of the first ledge to a second ledge that defines a base of the second recess perpendicular to the optical axis, where the second ledge receives an IR filter between the image sensor and the actuator;
    a third recess formed in the bottom surface having a narrower opening than the second recess, the third recess being defined by sides extending from an inner edge of the second ledge, the IR filter being below the third recess.

2. A camera module as defined in claim 1, wherein the electrical circuitry on the bottom surface includes three-dimensional circuitry.

3. A camera module as defined in claim 1, wherein the electrical circuitry on the bottom surface includes circuitry located on multiple different planes.

4. A camera module as defined in claim 3, wherein the multiple planes include three different planes.

5. A camera module as defined in claim 4, wherein the three different planes include a pair of planes that are substantially parallel to each other and a third plane that intersects the two substantially parallel planes.

6. A camera module as defined in claim 5, wherein the electrical circuitry further includes a plurality of conductive traces, each of which interconnects one of the first set of contact pads with one of the second set of contact pads, each conductive trace having a portion on each of the three different planes.

7. A camera module as defined in claim 1, wherein the electrical circuitry further includes a plurality of conductive traces, each of which interconnects one of the first set of contact pads with one of the second set of contact pads.

8. A camera module as defined in claim 1, wherein the actuator facilitates movement of the lens within a range of positions to position the lens at selectable distances from the image sensor.

9. A camera module as defined in claim 1, wherein the image sensor is connected to the second set of contact pads via solder bumps.

10. A camera module as defined in claim 1, wherein the camera module does not include a separate circuit board located between the image sensor and the mobile electronic device.

11. A camera module as defined in claim 1, wherein the interface between the camera module and the mobile electronic is via a solder connection between the first set of contact pads and contact pads on the mobile electronic device.

12. A camera module for attachment to a mobile electronic device, the camera module comprising: an actuator;
    a housing containing the actuator therein, the housing having a side wall and a bottom formed continuously with the side wall, the bottom including a bottom surface on which electrical circuitry is formed, the electrical circuitry including a first set of contact pads for electrical connection to the mobile electronic device and also including a second set of contact pads;

a lens received within the housing and coupled to the actuator so that the position of the lens can be adjusted by the actuator; and an image sensor including a third set of contact pads, the image sensor being electrically and mechanically connected to the housing by directly bonding the third set of contact pads to the second set of contact pads; and wherein the electrical circuitry on the bottom surface includes circuitry located on three different planes, including a pair of planes that are substantially parallel to each other and a third plane that intersects the two substantially parallel planes;

wherein the electrical circuitry further includes a plurality of conductive traces, each of which interconnects one of the first set of contact pads with one of the second set of contact pads, each conductive trace having a portion on each of the three different planes; and wherein the housing includes a first recess formed in the bottom surface thereof defining a first ledge that receives the image sensor, the first recess being defined by sides extending from the bottom of module and a first ledge at a base of the first recess perpendicular to the optical axis, the image sensor being mounted on the first ledge;

wherein the housing includes a second recess formed in the bottom surface having a narrower opening than the first recess, the second recess being defined by sides extending from an inner edge of the first ledge to a second ledge that defines a base of the second recess perpendicular to the optical axis, where second ledge receives an IR filter between the image sensor and the actuator;

a third recess formed in the bottom surface having a narrower opening than the second recess, the third recess being defined by sides extending from an inner edge of the second ledge, the IR filter being below the third recess.

13. A camera module as defined in claim 12, wherein the actuator facilitates movement of the lens within a range of positions to position the lens at selectable distances from the image sensor.

14. A camera module as defined in claim 12, wherein the image sensor is connected to the second set of contact pads via solder bumps.

15. A camera module as defined in claim 12, wherein the camera module does not include a separate circuit board located between the image sensor and the mobile electronic device.

16. A camera module as defined in claim 12, wherein the interface between the camera module and the mobile electronic device is via a solder connection between the first set of contact pads and contact pads on the mobile electronic device.

17. A camera module for attachment to a mobile electronic device, the camera module comprising:

an actuator;

a housing containing the actuator therein the housing having a side wall and a bottom formed continuously with the side wall, the bottom including a bottom surface on which electrical circuitry is formed, the electrical circuitry including a first set of contact pads that directly interface with and provide electrical connection to the mobile electronic device and also including a second set of contact pads;

a lens received within the housing and coupled to the actuator so that the position of the lens can be adjusted by the actuator; and an image sensor including a third set of contact pads, the image sensor being electrically and mechanically connected to the housing by directly bonding the third set of contact pads to the second set of contact pads;

a first recess formed in the bottom surface defining a first ledge that receives the image sensor, the first recess being defined by sides extending from a bottom of the module and a first ledge at a base of the first recess perpendicular to the optical axis, the image sensor being mounted on the first ledge;

a second recess formed in the bottom surface having a narrower opening than the first recess, the second recess being defined by sides extending from an inner edge of the first ledge to a second ledge that defines a base of the second recess perpendicular to the optical axis, where the second ledge receives an IR filter between the image sensor and the actuator;

a third recess formed in the bottom surface having a narrower opening than the second recess, the third recess being defined by sides extending from an inner edge of the second ledge, the IR filter being below the third recess.

18. A camera module as defined in claim 17, wherein there is not a separate circuit board at the interface between the camera module and the mobile electronic device.

19. A camera module as defined in claim 17, wherein the interface between the camera module and the mobile electronic device is via a solder connection between the first set of contact pads and contact pads on the mobile electronic device.

\* \* \* \* \*